Patented June 9, 1931

1,809,215

UNITED STATES PATENT OFFICE

WILLIAM B. PINE, OF OKMULGEE, OKLAHOMA, AND JOSEPH B. SHAW AND MYRIL C. SHAW, OF STATE COLLEGE, PENNSYLVANIA, ASSIGNORS OF TWENTY PER CENT TO SAID JOSEPH B. SHAW, TWENTY PER CENT TO SAID MYRIL C. SHAW, AND SIXTY PER CENT TO SAID PINE

PROCESS OF MAKING VITRIFIED ARGILLACEOUS PRODUCTS

No Drawing. Application filed November 4, 1929, Serial No. 404,863. Renewed March 21, 1931.

The present invention relates to the direct manufacture of vitrified products, from argillaceous materials such as clay and shale, and is based upon subjecting the said material to compression and deformation (e. g. molding under pressure) while at a temperature at which a substantial fraction only of the argillaceous material is actually in a fluid (i. e. fused) state. Thereby the solid portions or particles of the material are forced into the liquid portions thereof, whereby the latter, upon subsequent cooling and re-solidification becomes the binder to hold the article together. The fraction which so fuses should be a sufficient portion of the whole, to constitute a binder.

An object of the invention is to produce vitrified argillaceous products which are in some respects superior to any now known vitrified argillaceous products.

A common way, and in fact the ordinary way of producing vitrified clay products heretofore, has been to mix the clay with water sufficiently to form a plastic mass, then mold the plastic mass in any desired manner either under pressure or not under pressure, then dry the same and heat up to the vitrification range of temperature. Clay or shale used for ceramic purposes is always a heterogeneous mixture, containing kaolinite, or similar hydrous aluminum silicate and materials more readily fusible than kaolinite, and in many cases also materials less readily fusible than kaolinite. During the heating, the more readily fusible materials of course fuse first, and in the fused state these materials will perhaps react chemically more or less with other constituents present, and after the heating operation has been carried to a sufficiently high point the mass is allowed to cool whereupon the fused material solidifies into a glassy or crystalline binder. The expression "vitrification range" used in the art at present, means that range of temperature through which certain portions of the clay mass will fuse, without the entire material becoming fused. In fact in the manufacture of vitrified clay products, which have not become misshapen during the vitrifying operation, the mass never reaches the condition of being a viscous liquid, but does reach the stage of becoming substantially a plastic solid.

In the present process the temperature to which the material is heated during the high temperature treatment will be substantially the same as the temperature, for that particular material, constituting the maximum temperature usable in the vitrification process of the prior art, for that particular material.

In accordance with the present invention, the argillaceous material may be preliminarily shaped or not as desired, and if preliminarily shaped this operation can be conducted in a wet or dry or semi-wet condition, as desired. The material is heated, either in a shaped condition or not, up to a temperature which must be always slightly below the P. C. E. (pyrometric cone equivalent) of that particular material, and preferably not more than 100° C. below the P. C. E. value of that particular argillaceous material. The heating may be conducted slowly or rapidly as desired, and the heat can be supplied in any desired manner, by combustion, electric furnace or in any other way. The material is then ready for molding, shaping, compressing into the desired shape and size. When the material has reached the temperature at which it is to be molded, the same will be a mixture of heterogenous character, containing (a) solids, (b) viscous liquids and (c) liquids of relatively low viscosity. And considered as a mass, it is a plastic solid. The entire mass is never fused, and hence not weakened by fusion. Obviously there is no separation of the material, into a solid part and a liquid part, under these conditions.

Clay is a heterogeneous mixture of different crystalline and amorphous materials. Under heat, new materials will be formed by chemical reaction. As the temperature progresses, a point is reached where certain of these compounds are converted from the solid to the freely liquid state of fusion. Other of these materials under heat have a range of temperature over which they are highly viscous liquids. Any change whatsoever from solid to liquid state by heating, up to a certain point, results in shrinkage in volume, decrease in porosity and increase in strength. These changes are evidence of vitrification. Complete vitrification is followed at higher temperatures by fusing and swelling if gases are evolved or entrapped.

At any given temperature a particle composed wholly of a given material in the mass will have uniform solidity, or fluidity throughout its mass. Different compounds or particles (which may be crystals or not) will have different viscosities at any given temperature. The viscosity of the clay mass is the resultant viscosity of all the materials present.

In our process, the percent of solid at the highest temperature to which the mass is subjected is always relatively high (say 50 to 80% of the whole mass), so that the mass will be handled as a solid under atmospheric pressure but the per cent of liquid is sufficiently high to admit of pressing the solids into the liquid and to fill substantially all voids between the grains of solids to serve as a cementing medium holding the grains of solids together and the whole forming a solid substantially impervious mass when cooled. At the time when the material is to be pressed into shape, it should be about on the border line between a very viscous liquid and a plastic solid, so that at such temperature, the material will only deform slightly, if at all, by the force of gravity, even if kept at that temperature for a considerable time, say 24 hours.

At this stage one should clearly distinguish between a liquid mass or fused mass of low viscosity, a highly viscous liquid, a plastic solid and a rigid solid material. The relative proportions of unfused solid matter, highly viscous liquid and liquid of low viscosity should be such that the mass would have to be handled as a solid, and the mass could not be molded or cast by flowing the same as a liquid into a mold. The mass itself can not be considered as a liquid mass containing solids in suspension, but is a plastic solid, namely it is composed in major part (well over 50%) of solid particles, mixed with a smaller amount of fluids, at this stage. The mass is then ready for molding.

The molds might possibly be cold but are preferably hot, in order not to extract too much heat from the mass of material during the early stages of the molding operation. If the mass has been heated in bulk, it can be shoveled, raked or dropped at this stage, into a suitable mold, and then pressure applied for molding the material. The pressure may (for example) be applied by suitable rollers which compress the plastic solid material into the mold, and which, throughout the body of the material push the solid portions into the liquid portions of the mass and cause the liquid portions to flow into the voids between solid particles, whereby the liquid portions become a binder. Or the pressure could be applied by a rigid plunger. The pressure also will force out gases which may be entrapped in the mass. The compression must be performed at the time when the material contains a substantial amount (preferably over 20 or 25% i. e. a minor fraction only, but enough to make the mass cohere as a solid mass) of fused constituents, namely when the entire mass is in the condition of a plastic solid. This condition results from heating the mass to the vitrification temperature for the particular material. This temperature is critical for each clay or shale.

A plastic solid is a material having such consistency that when pressure is applied to it, no deformation results until the pressure reaches a certain value called the yield point. For pressures above this value the deformation is directly proportional to pressure.

A viscous liquid on the other hand does not require the initial pressure to start deformation. Deformation is directly proportional to pressure, starting at zero, and a mass of viscous liquid will deform slowly by gravity.

We call attention to the feature that suitable metal reinforcements can be provided in the mold before or during the step of filling the mold with the material, whereby a reinforced product will be produced. Any of the ordinary steel or iron reinforcements can be used in this process.

Samples of argillaceous shale were examined in accordance with the usual method of examination of clay and shale to determine their properties and determine their usefulness for making ceramic products. The following is the data secured in these tests.

Sample No. 1.—Color, dark gray; plasticity, good

| No. | Temp. Deg. C. | Porosity | Absorption | Vol. shrink |
|---|---|---|---|---|
| | | Per cent | Per cent | Per cent |
| 1 | 1000 | 34.1 | 20.4 | 1.4 |
| 2 | 1050 | 32.0 | 19.5 | |
| 3 | 1100 | 31.7 | 19.1 | .85 |
| 4 | 1150 | 30.9 | 18.2 | 3.0 |
| 5 | 1200 | 27.6 | 15.7 | 5.5 |
| 6 | 1250 | 25.0 | 13.7 | 9.6 |
| 7 | 1300 | 11.4 | 5.5 | 20.8 |
| 8 | 1350 | 2.7 | 1.2 | 26.9 |

Linear shrinkage: 5.5%
P. C. E.—Cone: 12—(=1370° C.)

*Sample No. 2.—Color, light tan; plasticity, good*

| No. | Temp. Deg. C. | Porosity | Absorption | Vol. shrink |
|---|---|---|---|---|
|   |   | Per cent | Per cent | Per cent |
| 1 | 1000 | 28.6 | 16.4 |  |
| 2 | 1050 | 29.4 | 16.8 |  |
| 3 | 1100 | 27.7 | 15.2 | 3.9 |
| 4 | 1150 | 25.5 | 13.8 | 5.9 |
| 5 | 1200 | 19.9 | 10.3 | 10.1 |
| 6 | 1250 | 15.6 | 7.7 | 14.1 |
| 7 | 1300 | 3.6 | 1.6 | 20.8 |
| 8 | 1350 | 4.9 | 2.9 | —3.0 |

Linear shrinkage: 7.5%
P. C. E.—Cone: 14—(=1410° C.

The data on these shales would be interpreted as representing material capable of producing a good face brick or hollow tile when treated in accordance with present practices in manufacturing these products.

We give the following experiments made on Samples No. 1 and 2 respectively, in accordance with the present invention.

*Example 1.*—The shale referred to in Sample 1 above, was first crushed so that 50% of the same would pass through a 28 mesh screen, and the remaining 50% would pass through an 8 mesh screen but would be retained on a 28 mesh screen. This material was then thoroughly mixed together and was very slightly moistened, and was then pressed into a briquet while moist. The material was then placed into a muffle of a furnace and was heated up to about 1270° C., at which point it was subjected to pressure by a heavy roller, was again heated to 1270° C. and again subjected to pressure by the roll, again reheated to 1270° C. and again subjected to pressure by the roll. In this experiment the material cooled off substantially during each rolling, but the temperature at the time of rolling was close to 1270° C. During this operation the thickness was reduced about one-third. The product was then put back into the muffle and the fire turned out to allow the muffle to cool slowly for annealing the material. The temperature of 1270 is about 100 degrees below the P. C. E. of that material. The resulting product was an extremely hard, rock-like, strong, dense, vitreous material. The material is substantially free from bubbles and is substantially impervious. It is heavier than any product that could be made by prior processes from the same raw material, (bulk specific gravity is here referred to). A broken surface of this product shows complete vitrification and shows a stony fracture. This material being made from a mixture of coarse and fine particles, the coarse grains have not lost their identity although in some cases they have been distorted by the pressure.

In this particular example the product was made from a mixture of coarse and fine material in equal volumes. However we call attention to the fact that these proportions can vary substantially or the process can be applied to the treatment of material all of which is fine.

*Example 2.*—The material No. 2 referred to, all crushed to pass a 28 mesh screen was mixed with a little water and made into a rough tile. This was heated to 1350° C., (60 degrees below the P. C. E. value) in the muffle (after drying) and then was pressed between rollers three times as above indicated under Example 1, then annealed. This clay had developed a decidedly visicular structure doing the heating process and had swelled materially. This product was dense but decidedly vitreous in character, gas bubbles had been flattened out to narrow slits by the rolling process. During the rolling operation the thickness was decreased to about one-third of the original thickness. Such a material would be suitable for a beam or post, a railway tie, brick or tile or paving material.

A particular utility of the product of the present invention is for the manufacture of paving bricks, and large paving units or slabs. Thus for instance it is entirely feasible to mold, by the methods hereinabove described, large paving slabs, say 5 to 10 feet square, reinforced or not as desired, which may be 5 to 10 inches thick. These can be readily manufactured and shipped to the point of use. Also heavy building materials such as beams, terra-cotta, tiles, building blocks, railroad ties, curbstones, sidewalk slabs, large refractory blocks for refractory purposes (as for example glass making tanks, or glass melting tanks) can be made by this process, any or all of which may be reinforced if desired. It is to be noted that we do not confine the invention to the making of slabs or blocks, but products of any desired shape or sizes can be made by this process.

An important feature of the present invention is the possibility of carrying out the process in a continuous manner, largely mechanically, thereby eliminating hand labor to a large extent.

Another important advantage is the fact that the process very greatly reduces the time necessary for producing a vitrified clay product, resulting in a material lowering of the fuel required.

Reference has been made herein to having the material at temperatures well above the temperature of incipient vitrification of the particular material, prior to compressing the same into its final shape. This expression "temperature of incipient vitrification" of course refers to temperatures at which the material will commence to vitrify while the material is at atmospheric pressure. When such a material is subjected, at that temperature or slightly below, to high pressure (several hundred or even several thousand pounds per square inch) in a mold, for a considerable period of time, vitrification would take place along with the shaping of the material.

The compression, or molding under pressure, in the present invention, is effected within the vitrification range, of the particular material used. Furthermore the element of time during which pressure is applied, is not a factor in bringing about vitrification of the product. The pressing can be momentary or can be continued for a long time, as desired.

The function of pressure in the present process is simply to shape the article and to compress the already hot material into a dense strong product.

We do not limit ourselves to the use of a single clay or shale but we may blend two or more clays or shales or add other materials than clay. The material when formed will be in the consistency of clay during the vitrification process and not the consistency of glass during the blowing or casting process.

We may operate with high pressure at temperatures low in the vitrification range or with lower pressures at temperatures higher in the vitrification range.

The finished product will be a vitrified ceramic product, not a glass. Fracture of the product may be stony or vitreous.

While the rolling process is easily used and probably most desirable, we may use direct pressure at any angle or apply pressure by any suitable means.

We have referred above to metallic reinforcements of steel or iron. Other metallic pieces, such as copper wire or rods, brass, etc., may be introduced as electrical conductors.

Products prepared according to the present process are claimed in our copending divisional application Serial No. 468,452 in compliance with an official requirement for the division.

We claim:—

1. A process which comprises heating an argillaceous material selected from the herein described group consisting of natural clays, shales and mixtures thereof, to a temperature which while below the P. C. E. value of the particular argillaceous material, is substantially above the temperature of incipient vitrification thereof, applying molding pressure to said material while at said temperature, to directly form a vitrified product.

2. A process which comprises heating an argillaceous material selected from the herein described group consisting of natural clays, shales and mixtures thereof, to a temperature which while below the P. C. E. value of the particular argillaceous material, is substantially above the temperature of incipient vitrification thereof, applying molding pressure only momentarily to said material while at said temperature, to directly form a vitrified product.

3. A process of making a molded vitrified clay product which comprises heating argillaceous material selected from the herein described group consisting of natural clays, shales and mixtures thereof, to a high temperature to form a material sufficiently plastic to bond thoroughly upon pressing, the mass while in such heated state being too cool to flow as a suspension of solid particles in a liquid mass, and while in this state, molding the mass under pressure.

4. A process which comprises molding argillaceous material lacking in sufficient amounts of feldspar and quartz to constitute a porcelain raw mix, while within the vitrification range of temperature of that material, without heating the said material to its temperature of fusion and without heating to a temperature at which the said material would form a flowable suspension of solid particles in a liquid mass.

5. An improvement in preparing vitrified ceramic ware from a material selected from the herein described group consisting of natural clays, shales and mixtures thereof, which process comprises heating said material in bulk, at atmospheric pressure, while not confined in a pressure-tight mold, to such a temperature as will convert a minor portion only thereof into a liquid by fusion, then while the bulk of said material is unfused and the mass of material is at such a temperature as to be handled as a solid, molding under pressure while the said portion only is still in a liquid state.

6. In the manufacture of vitrified ceramics from an argillaceous raw material selected from the herein described group consisting of natural clays, shales and mixtures thereof, containing less than 25% to 30% of $Al_2O_3$, which comprises heating said material in bulk, at atmospheric pressure, while not confined in a pressure-tight mold, to such a temperature as to convert a minor fraction only thereof into a liquid by fusion, then molding under pressure while the said portion is still in a liquid state.

7. In the process of claim 4, the steps of first roughly shaping the mass, and after heating to within the vitrification range, applying the molding pressure by a rolling operation.

8. A process of making articles from argillaceous material lacking in sufficient amounts of feldspar and quartz to constitute a porcelain raw mix, which consists in heating the material to at least the temperature of incipient vitrification and subjecting the material while at that temperature and while the bulk of the material is still solid, to pressure.

9. The process of making articles from argillaceous material lacking in sufficient amounts of feldspar and quartz to constitute a porcelain raw mix, which consists in shaping the articles by pressure when at a temperature sufficiently high to soften by fusion a minor fraction only of the material.

10. A process of making articles from argillaceous material lacking in sufficient amounts of feldspar and quartz to constitute a porcelain raw mix, which comprises heating said material to a temperature at which it will show visible signs of vitrification at atmospheric pressure, then subjecting the material while the bulk thereof is solid, to pressure while at said temperature.

11. A process which comprises molding argillaceous material lacking in sufficient amounts of feldspar and quartz to constitute a porcelain raw mix, while a minor part only of the same is fused to a liquid state.

12. A process which comprises the steps of raising the temperature of argillaceous material selected from the herein described group consisting of natural clays, shales and mixtures thereof, to partial fusion, whereby about 20 to 50% of said material is converted into a liquid state, and while in that condition subjecting the mass to mechanical pressure sufficient to force the molten portion into pores and interstices of the unfused grains, and around said grains, whereby the molten portion becomes a binder for holding the unfused grains together, and annealing the resulting compressed mass, whereby a hard durable stone-like article will result.

13. In the process of claim 4, the steps of first roughly shaping the mass, and after heating to within the vitrification range, applying the molding pressure.

14. The herein described process which comprises the simultaneous molding and vitrification of argillaceous material, selected from the herein described group consisting of natural clays, shales and mixtures thereof, while the bulk of said material is in a solid state.

In testimony whereof we affix our signatures.

WILLIAM B. PINE.
JOSEPH B. SHAW.
MYRIL C. SHAW.